United States Patent [19]
Laskaris et al.

[11] Patent Number: 5,548,168
[45] Date of Patent: Aug. 20, 1996

[54] SUPERCONDUCTING ROTOR FOR AN ELECTRICAL MACHINE

[75] Inventors: Evangelos T. Laskaris, Schenectady; Kenneth G. Herd, Niskayuna, both of N.Y.

[73] Assignee: General Electric Company, Schenectady, N.Y.

[21] Appl. No.: 267,625

[22] Filed: Jun. 29, 1994

[51] Int. Cl.$^6$ ................................................ H02K 9/00
[52] U.S. Cl. .............................. 310/52; 310/1.0; 310/261
[58] Field of Search .................................. 316/40 R, 10, 316/52, 261

[56] References Cited

U.S. PATENT DOCUMENTS

| | | | |
|---|---|---|---|
| 3,428,926 | 2/1969 | Bogner et al. | 310/54 |
| 3,891,875 | 6/1975 | Laskaris | 310/52 |
| 3,991,333 | 11/1976 | Laskaris | 310/52 |
| 4,048,529 | 9/1977 | Pomeroy et al. | 310/54 |
| 4,082,967 | 4/1978 | Laskaris | 310/64 |
| 4,155,019 | 5/1979 | Weghaupt | 310/61 |
| 4,176,291 | 11/1979 | Rabinowitz | 310/10 |
| 4,176,292 | 11/1979 | Kalsi et al. | 310/52 |
| 4,251,745 | 2/1981 | Germann | 310/52 |
| 4,278,905 | 7/1981 | Chari et al. | 310/52 |
| 4,279,944 | 7/1981 | Laskaris | 29/59 |
| 4,291,997 | 9/1981 | Laskaris | 310/52 |
| 4,924,198 | 5/1990 | Laskaris | 335/216 |
| 4,986,078 | 1/1991 | Laskaris | 335/216 |
| 5,034,713 | 7/1991 | Herd et al. | 335/216 |
| 5,381,122 | 1/1995 | Laskaris et al. | 335/216 |

FOREIGN PATENT DOCUMENTS 3613039  10/1987  Germany.

OTHER PUBLICATIONS

"Development of a Helium Transfer Coupling for Superconducting Generators" by Guangfu et al., cryogenics, vol. 30, Sep. 30, 1990, pp. 735–738.

"Recent Progress of Development of 70MW Class Superconducting Generators", by N. Higuchi et al., IEEE Transactions on Applied Superconductivity, vol. 3, No. 1, pp. 369–372, Mar. 1993.

"Rotor Design of a 1000MW Superconducting Generator", by K. Yamaguchi et al., 88SM620-7, IEEE/PES 1988 Summer Meeting, Portland, OR, Jul. 24–29, 1988, pp. 1–6.

"Development of a Coolant Circuit for Rotors of Superconducting Generators" by P. A. Rios et al., submitted to Conference of Technical Applications of Superconductivity, Alushta, U.S.S.R., pp. 1–10, Sep. 16–19, 1975.

"Design Studies of Superconducting Generators", by S. H. Minnich et al., IEEE Transactions on Magnetics, vol. MAG–15, No. 1, pp. 703–709, Jan. 1979.

*Primary Examiner*—R. Skudy
*Attorney, Agent, or Firm*—Douglas E. Erickson; Marvin Snyder

[57] ABSTRACT

A superconductive rotor, such as an electric generator rotor, has a cylindrical-shaped solid (e.g., iron) core having a pair of diametrically-opposed and longitudinally-extending slots. A longitudinally-extending, racetrack-shaped superconductive coil surrounds the solid core and has straight portions located in the slots. A longitudinally extending, racetrack-shaped thermal shield generally encloses the superconductive coil and has generally straight portions located in the slots. The thermal shield is generally spaced apart from the superconductive coil and from the solid core. A pair of end shafts are each attached to the solid core and are spaced apart from the thermal shield. One end shaft has a cryogen transfer coupling for cooling the superconductive coil, preferably with gaseous helium.

10 Claims, 6 Drawing Sheets

5,548,168

SUPERCONDUCTING ROTOR FOR AN ELECTRICAL MACHINE

BACKGROUND OF THE INVENTION

The present invention relates generally to superconductivity, and more particularly to a superconductive rotor for synchronous electrical machines.

Synchronous electrical machines having rotors include, but are not limited to, generators and motors. Non-superconducting rotors include solid-core rotors, such as iron-core rotors. Iron-core rotors saturate at an air-gap magnetic field strength of about 2 Tesla. Known superconductive rotors employ air-core designs to achieve air-gap magnetic fields of 3 Tesla or higher. Air-core superconductive rotors require large amounts of superconductive wire which adds to the number of coils required, the complexity of the coil supports, and the cost. Such superconductive rotors have their superconductive coils cooled by liquid helium, with the used helium being returned as room-temperature gaseous helium. Using liquid helium for cryogenic cooling requires continuous reliquefaction of the returned, room-temperature gaseous helium, and such reliquefaction poses significant reliability problems and requires significant additional energy. What is needed is a superconductive rotor, for an air-gap magnetic field strength of about 2 Tesla or less, that does not have the disadvantages of the air-core and liquid-cooled superconductive rotors.

SUMMARY OF THE INVENTION

It is an object of the invention to provide a superconductive rotor which has a solid core.

It is a further object of the invention to provide a superconductive rotor which has its superconductive coil cooled by a cryogenic gas.

The superconductive rotor of the invention includes a generally longitudinally-extending axis and a generally cylindrical-shaped solid core generally coaxially aligned with the axis and having a pair of generally diametrically-opposed and generally longitudinally-extending slots. A generally longitudinally-extending, racetrack-shaped superconductive coil surrounds the solid core and has generally straight portions located in the slots. A generally longitudinally-extending, racetrack-shaped thermal shield generally encloses the superconductive coil and has generally straight portions located in the slots. The thermal shield is generally spaced apart from the superconductive coil and from the solid core. A pair of end shafts are each attached to the solid core and are generally spaced-apart from the thermal shield. One of the pair of end shafts has a cryogen transfer coupling. Preferably, the cryogen transfer coupling is a gaseous-cryogen transfer coupling.

Several benefits and advantages are derived from the invention. The solid core allows a 2-Tesla (or less) superconductive rotor to use about 10 times less superconductive wire than would be used for an air-core superconductive rotor design. The drastic reduction in the amount of superconductive wire needed by the rotor reduces the number of coils needed and reduces the complexity of the coil supports which together allow for superconductive coil cooling by a gaseous cryogen (such as gaseous helium), instead of by a liquid cryogen (such as liquid helium), with such gaseous cryogen being kept cool by, for example, a remotely-sited cryocooler.

BRIEF DESCRIPTION OF THE DRAWINGS

The accompanying drawings illustrate a preferred embodiment of the present invention wherein.

DETAILED DESCRIPTION OF THE INVENTION

Figure 1:
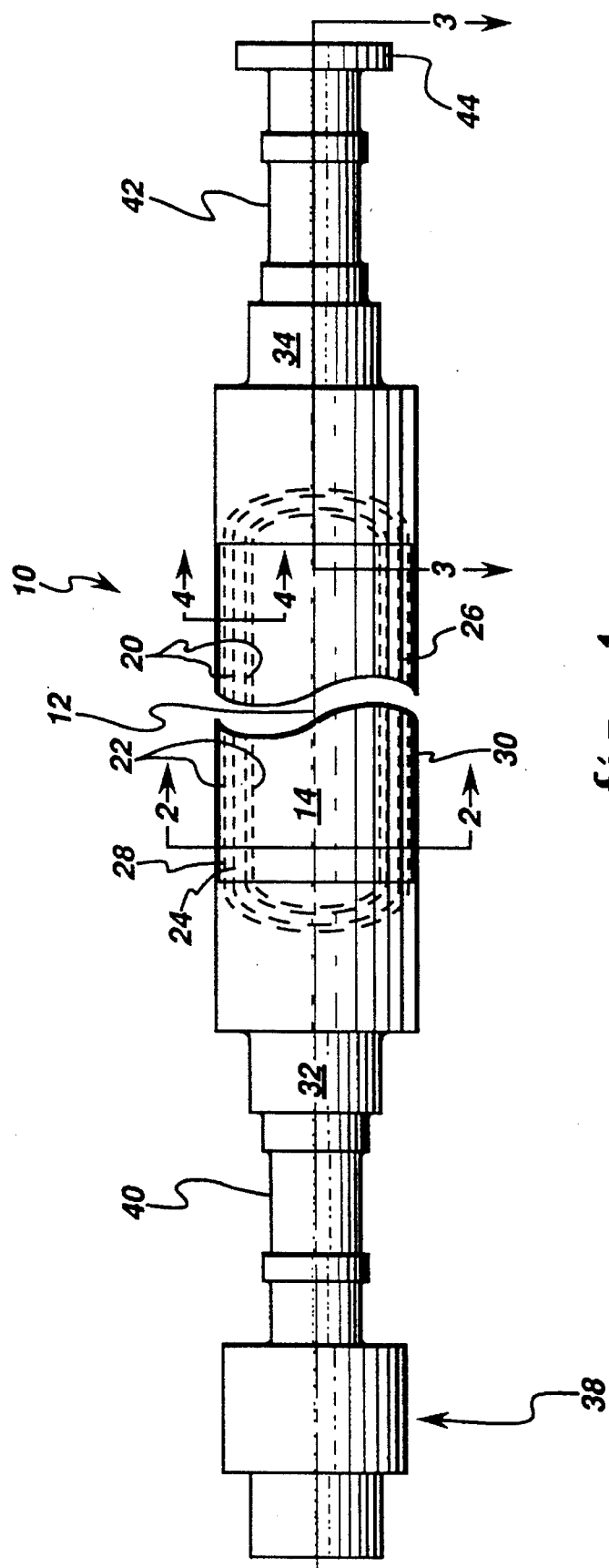
Figure 1 is a schematic side elevational view of the superconductive rotor of the invention.
Figure 2:
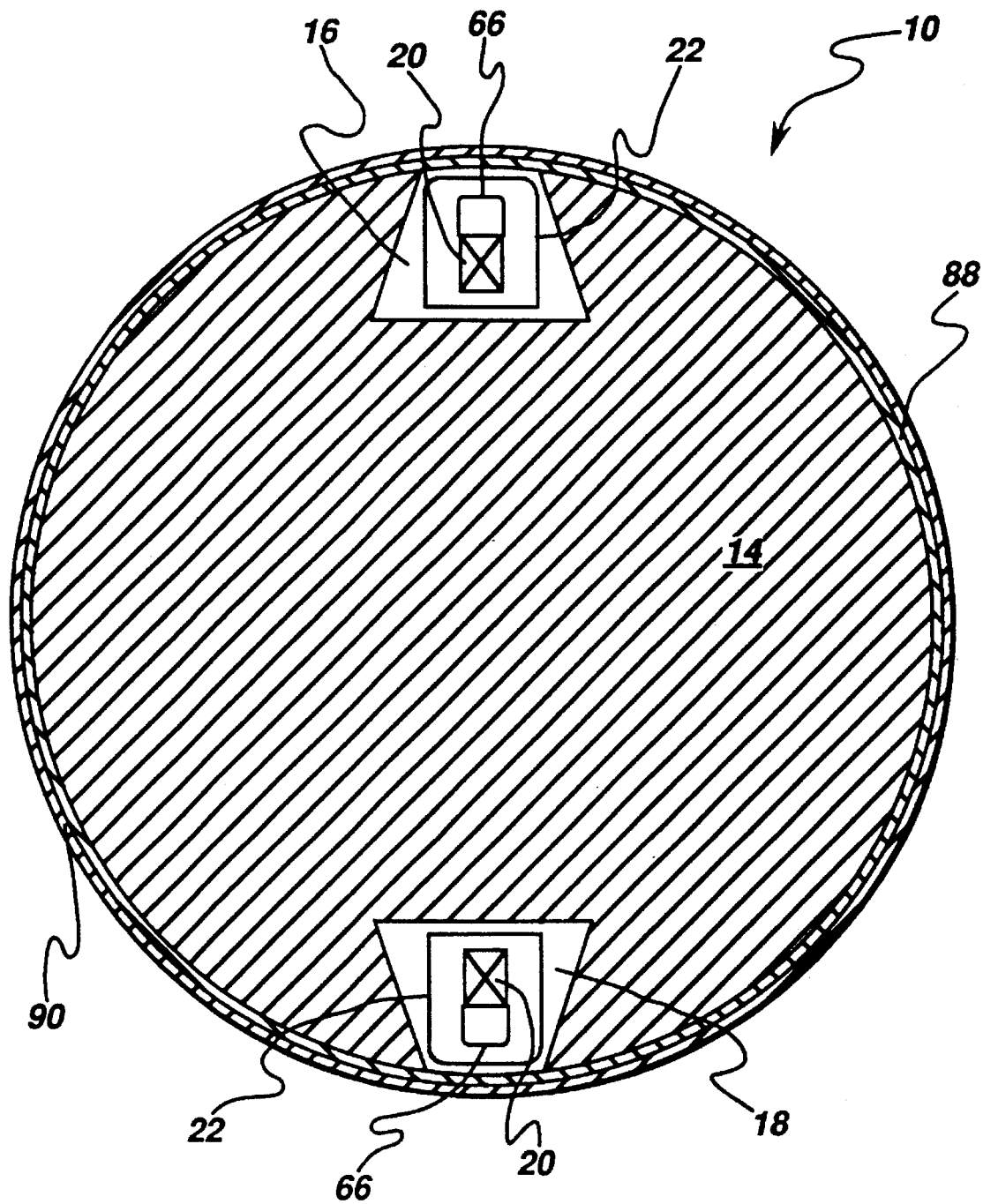
FIG. 2 is a schematic sectional view taken along lines 2—2 in FIG. 1.
Figure 3:
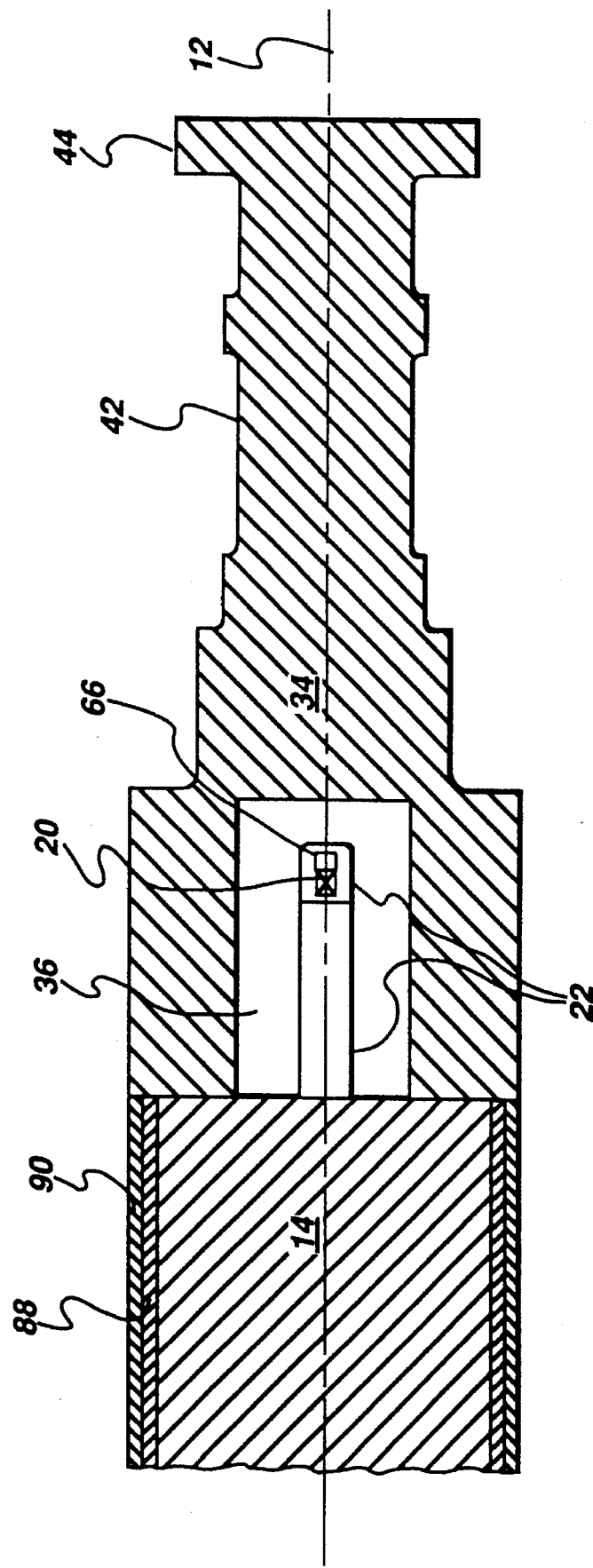
FIG. 3 is a schematic sectional view taken along lines 3—3 in FIG. 1.

Referring now to the drawings, wherein like numerals represent like elements throughout, FIGS. 1–6 show a preferred embodiment of the superconductive rotor 10 of the present invention. It is noted that existing non-superconducting electrical machines, such as conventional generators, may be retrofitted to have their non-superconductive rotors replaced with the superconductive rotor 10. The superconductive rotor 10 includes a generally longitudinally-extending axis 12 and a generally cylindrical-shaped solid core 14 generally coaxially aligned with the axis 12. The solid core 14 has high magnetic permeability, is usually made of a ferromagnetic material, and typically is an iron core. The solid core 14 has a pair of generally diametrically-opposed and generally longitudinally-extending slots 16 and 18. The superconductive rotor 10 also includes a generally longitudinally-extending, racetrack-shaped superconductive coil 20 and a generally longitudinally-extending, racetrack-shaped thermal shield 22 (both seen in dashed line in FIG. 1, seen in solid line in FIGS. 2 and 3, and seen in detail in FIG. 4). The superconductive coil 20 surrounds the solid core 14 and has generally straight portions 24 and 26 disposed in the slots 16 and 18. The thermal shield 22 generally encloses the superconductive coil 20 and has generally straight portions 28 and 30 disposed in the slots 16 and 18. The thermal shield 22 is generally spaced apart from the superconductive coil 20 and from the solid core 14. The superconductive rotor 10 further includes a pair of end shafts 32 and 34 attached to the solid core 14 and generally spaced-apart from the thermal shield 22. For example, FIG. 3 shows end shaft 34 with a notch 36 and shows the thermal shield 22 (and the superconductive coil 20) disposed in the notch 36 spaced-apart from end shaft 34. One of the pair of end shafts 32 has a cryogen transfer coupling 38. When the superconductive rotor 10 is rotating as part of an operating electrical machine, the cryogen transfer coupling 38 would have a stationary segment and a rotating segment as can be appreciated by the artisan.

Figure 5:
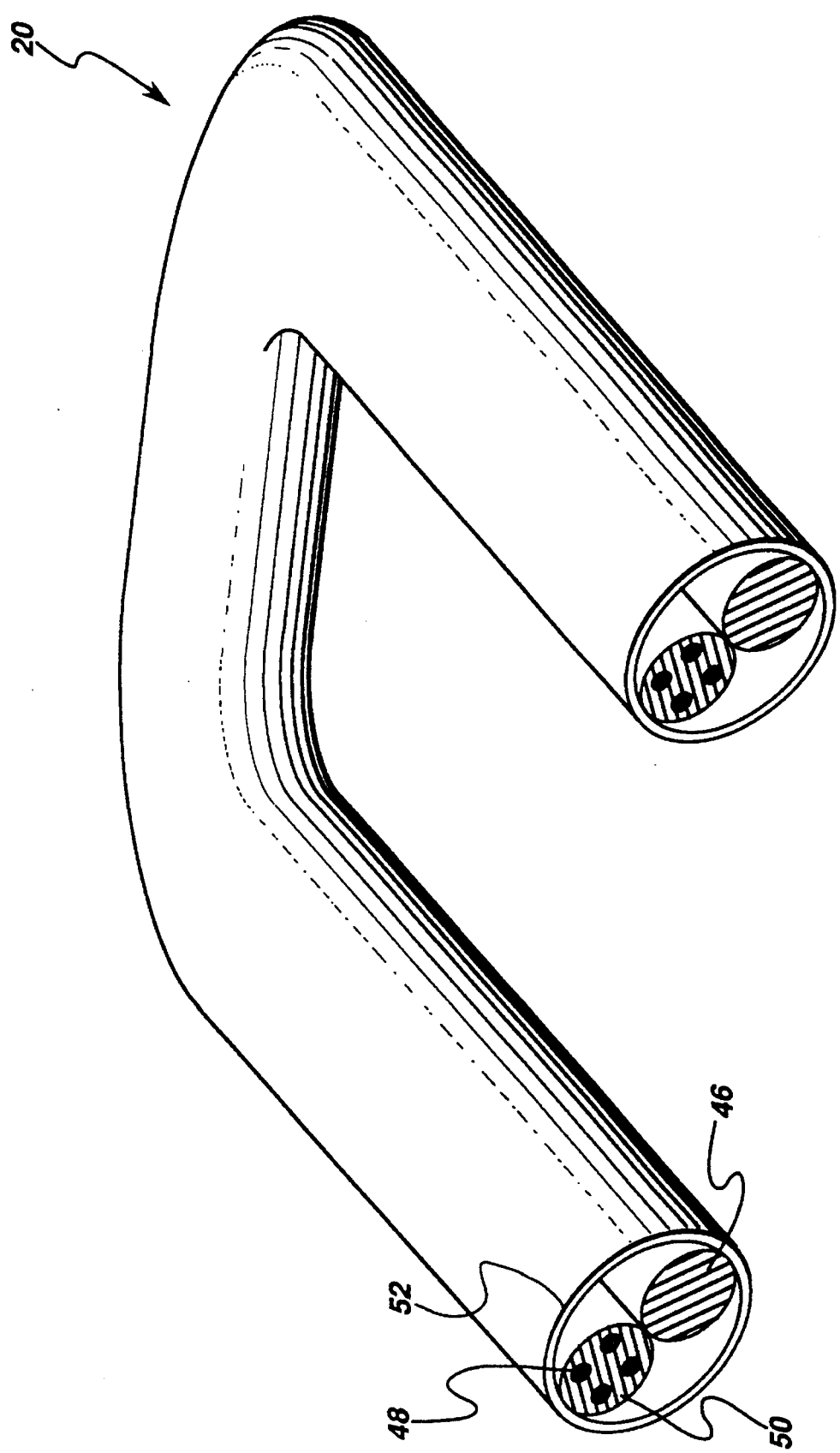
FIG. 5 is a schematic view of a portion of one turn of the superconductive coil shown in FIG. 4 with such portion cut away to expose the wires contained therein.
Figure 6:
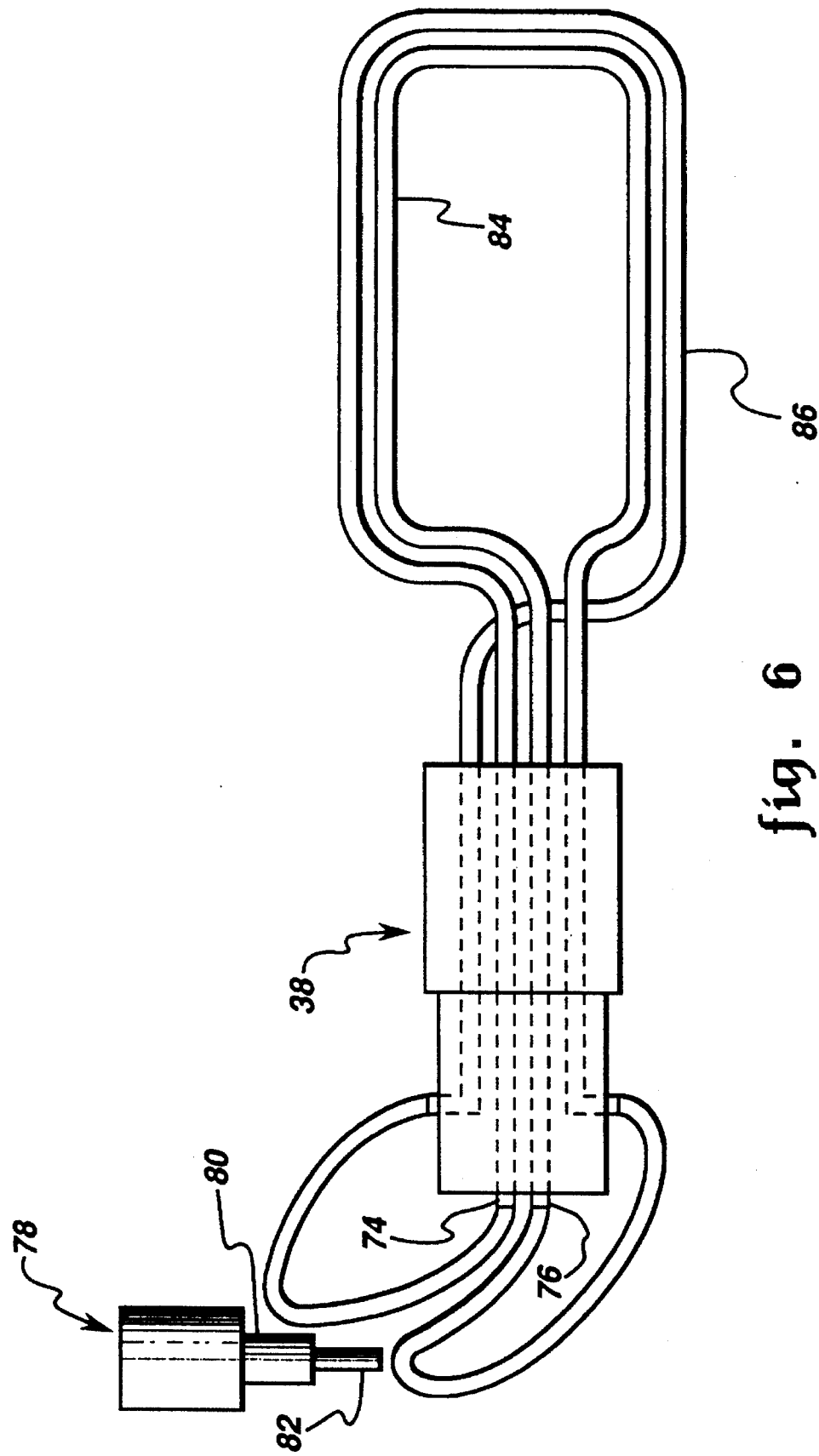
FIG. 6 is a schematic view of the cryogen transfer coupling of the superconductive rotor shown in FIG. 1 showing the gaseous-cryogen cooling circuits including the first and second cooling tubes shown in FIG. 4.

Preferably, the superconductive rotor 10 is a rotor of an electric generator, and the superconductive coil 20 is an electric-generator field coil. In an exemplary embodiment, the end shafts 32 and 34 include bearing journals 40 and 42, and the other of the pair of end shafts 34 has a turbine coupling 44. In a preferred embodiment, as seen in FIG. 5, the superconductive coil 20 comprises a stainless-steel support wire 46 co-paired and co-wound with a niobium-tin superconductive wire 48 having a copper stabilizer 50 and all enclosed in a surrounding fiberglass insulating sleeve 52. Such paired wires 46 and 48 are co-wound in as many turns and layers as necessary to create a particular superconductive coil 20. The stainless-steel wire 46 provides structural support for the superconductive wire 48 eliminating the need for conventional coil supports. It is noted that the wound superconductive coil 20 is epoxy impregnated for added rigidity and mechanical integrity.

Figure 4:
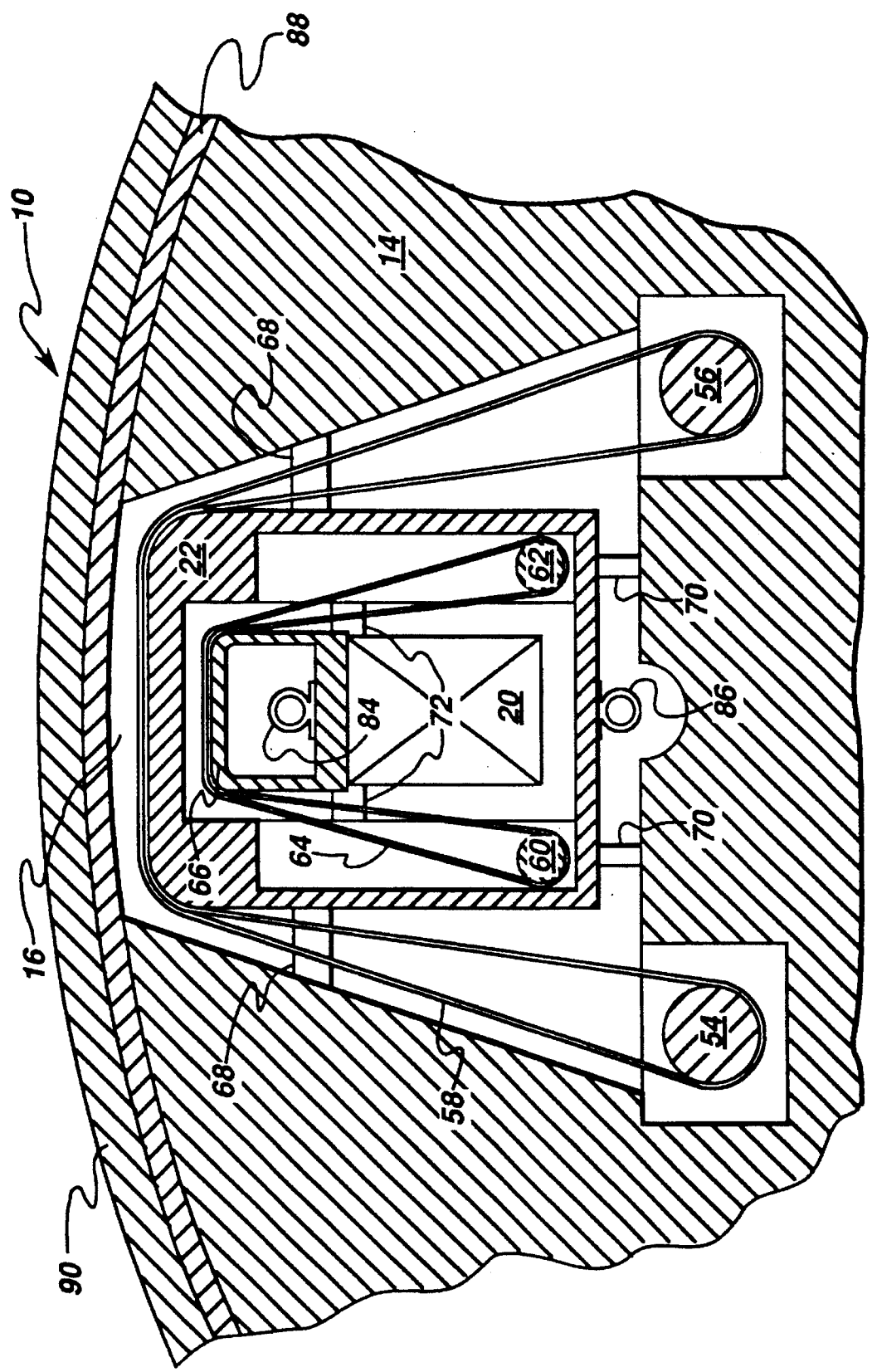
FIG. 4 is an enlarged detailed schematic view of the upper portion of FIG. 2.

As seen in FIG. 4, the superconductive rotor 10 also includes a pair of generally longitudinally-extending first support rods 54 and 56 attached to the solid core 14 proximate one of the slots 16 A plurality of longitudinally spaced-apart, rubber-band-shaped, first suspension straps 58 (only one of which is seen in FIG. 4) is disposed in the one slot 16. Each of the first suspension straps 58 has a center section placed over the thermal shield 22 and has end portions looped around the first support rods 54 and 56. The superconductive rotor 10 further includes a pair of generally longitudinally-extending second support rods 60 and 62 disposed in the one slot 16 and attached to the thermal shield 22. A multiplicity of longitudinally spaced-apart, rubber-band-shaped, second suspension straps 64 is disposed in the one slot 16. Each of the second suspension straps 64 has a center section placed over the superconductive coil 20 and has end portions looped around the second support rods 60 and 62. As seen in FIG. 4, a contoured housing 66 is disposed between the superconductive coil 20 and the center section of the second suspension strap 64 and is attached to the superconductive coil 20. Such contoured housing 66 improves the support for the superconductive coil 20 and increases the strap distance between the superconductive coil 20 and the thermal shield 22 for reduced heat transfer, as can be appreciated by those skilled in the art. An additional pair of first support rods and an additional plurality of first suspension straps (not shown in the figures) would be associated with supporting the thermal shield 22 in the other slot 18. Likewise, an additional pair of second support rods and an additional multiplicity of second suspension straps (not shown in the figures) would be associated with supporting the superconductive coil 20 in the other slot 18. It is not necessary to provide such radial support for the thermal shield 22 or the superconductive coil 20 in the notch (not shown in the figures) of the one end shaft 32 or in the notch 36 of the other end shaft 34.

Preferably, the superconductive rotor 10 further includes spacer tubes 68 and 70 and spacer plates 72 disposed in the one slot 16, as seen in FIG. 4, to provide proper centering of the thermal shield 22 within the one slot 16 and to provide proper centering of the superconductive coil 20 within the thermal shield 22. Each of the spacer tubes 68 and 70 has a first end attached to the solid core 14 and has a second end extending into the one slot 16 towards the thermal shield 22. Each of the spacer plates 72 has a first portion attached to the thermal shield 22 and has a second portion extending towards the superconductive coil 20. The spacer plates may also straddle the contoured housing (such straddling being omitted from the figures for clarity). Additional spacer tubes and spacer plates (not shown in the figures) would be provided for proper centering in the other slot 18, as can be appreciated by those skilled in the art. It is noted that when the superconductive rotor 10 is rotating in an electrical machine, centrifugal force will lift the thermal shield 22 off spacer tubes 70 resulting in less heat transfer. Appropriate longitudinal capture points (not shown in the figures) may be provided by the artisan to longitudinally capture the longitudinal midpoint of the thermal shield 22 in each slot 16 and 18 and to longitudinally capture the longitudinal midpoint of the superconductive coil 20 within the thermal shield 22. Additional spacer tubes (not shown in the figures) similar to spacer tubes 68 and additional spacer plates (not shown in the figures) similar to spacer plates 72 would provide proper lateral centering of the thermal shield 22 within the notch (not shown in the figures) of the one end shaft 32 and within the notch 36 of the other end shaft 34 and would provide proper lateral centering of the superconductive coil 20 within the thermal shield 22 in the region of the end shafts 32 and 34.

Preferably, the cryogen transfer coupling 38 is a gaseous-cryogen transfer coupling 38 having a first inlet 74 and having a second inlet 76. A cryocooler coldhead 78 has a cold first stage 80 and a colder second stage 82. The first inlet 74 is in fluid communication with a gaseous cryogen (such as gaseous helium) cooled by the cryocooler coldhead first stage 80, and the second inlet 76 is in fluid communication with a gaseous cryogen (such as gaseous helium) cooled by the cryocooler coldhead second stage 82.

The superconductive rotor 10 additionally includes a generally racetrack-shaped, first cooling tube 84 disposed between the superconductive coil 20 and the thermal shield 22, generally spaced apart from the thermal shield 22, in thermal contact with the superconductive coil 20, and in fluid communication with the second inlet 76 of the gaseous-cryogen transfer coupling 38. The superconductive rotor 10 moreover includes a second cooling tube 86 disposed between the thermal shield 22 and the solid core 14, generally spaced apart from the solid core 14, in thermal contact with the thermal shield 22, and in fluid communication with the first inlet 74 of the gaseous-cryogen transfer coupling 38.

The superconductive rotor 10 has a generally tubular-shaped vacuum envelope 88 attached to the solid core 14, covering the slots 16 and 18, and generally spaced apart from the thermal shield 22. A vacuum is drawn on the free volume within the slots and notches to minimize unwanted heat transfer, as can be appreciated by those skilled in the art. A conventional aluminum electromagnetic shield 90 surrounds the vacuum envelope 88.

In an exemplary embodiment, the solid core 14 is made of iron. The superconductive coil 20 is epoxy-impregnated and includes a niobium-tin superconductive wire co-paired and co-wound with a stainless-steel support wire, as previously described. The contoured housing 66 is made of aluminum or stainless steel. The thermal shield 22 is made of aluminum. The first and second cooling tubes 84 and 86 are made of aluminum or stainless steel. The first and second support rods 54, 56, 60, and 62 are made of titanium or hardened non-magnetic steel. The first and second suspension straps 58 and 64 are made of epoxy-impregnated fiberglass or carbon graphite or other thermal insulating material to minimize heat transfer between their center and end sections. The end shafts 32 and 34 are made of high magnetic permeability carbon steel. The spacer tubes 68 and 70 are made of fiberglass-epoxy composite, and the spacer plates are made of carbon graphite-epoxy composite to minimize heat transfer between their first and second ends or portions. The vacuum envelope 88 is made of stainless steel. A conventional Gifford-McMahon cryocooler is used with the coldhead first stage 80 cooling the thermal shield 22 to a temperature of about 40 Kelvin and with the coldhead second stage 82 cooling the superconductive coil 20 to a temperature of about 10 Kelvin. Preferably, for ease of assembly, the solid core 14 is made of a large center piece which also defines the bottom of the slots 16 and 18, two smaller pieces each defining a side of slot 16, and two other smaller pieces each defining a side of slot 18. Such pieces (not separately shown in the figures) are joined together to define the solid core 14. Likewise, for ease of assembly, the thermal shield 22 is made of a top piece, a bottom piece, and two side pieces (not separately shown in the figures) which are brought together and welded together in the slots 16 and 18, as can be appreciated by the artisan.

An engineering analysis of an electric generator superconductive rotor designed in accordance with the principles of the present invention would result in using 200 pounds of superconductive wiring compared with having to use 10,000 pounds of non-superconductive copper wiring in a non-superconductive rotor design or having to use 2000 pounds of superconductive wiring in an air-core, liquid-helium cooled superconductive rotor design. It is noted that the advantage of any superconductive rotor is the elimination of resistive loses and, because of cryogenic cooling, the elimination of thermal cycling problems. Air-core superconductive rotors require large amounts of superconductive wire which adds to the number of coils required, the complexity of the coil supports, and the cost when compared with the superconductive rotor 10 of the present invention. Liquid-helium cooled superconductive rotors require continuous reliquefaction of the returned, room-temperature gaseous helium, with such reliquefaction posing significant reliability problems and requiring significant additional energy. Such cooling problems are not present in the superconductive rotor 10 of the present invention.

It is noted that the detail design of an appropriate gaseous-cryogen transfer coupling 38 (including its stationary and rotating segments) is within the skill of the artisan, such detail design not forming a part of the present invention. However, a best mode of supplying cold gaseous cryogen to the superconducting rotor is through a thermally insulated transfer coupling. Such a transfer coupling is functionally similar to the liquid-helium transfer couplings known in the prior art, with the following exceptions: 1) the cryogen is single-phase throughout the cooling circuit, and therefore the difficulties associated with two-phase flow (e.g. stratification, entrainment, etc.) are eliminated; 2) it is thermodynamically advantageous to return the gaseous cryogen to the refrigerator (cryocooler) cold, therefore a best mode transfer coupling insulates the cold return gas as well as the inlet gas from heat inputs; and 3) an actively-cooled rotor thermal shield may be used, requiring that two independent gas streams enter and leave the transfer coupling, and each gas stream must be insulated from heat inputs to improve the thermodynamic efficiency of the refrigerator.

It is further noted that the detail design of an appropriate gaseous-cryogen supply system (including any required pumps) is within the skill of the artisan, such detail design not forming a part of the present invention. However, a best mode of supplying the cold gaseous cryogen stream to the superconducting rotor is to use a stationary cryogenic refrigerator (cryocooler) to precool a gas stream from ambient temperature to a cryogenic rotor inlet temperature. This precooling is preferably achieved by pressurizing the ambient temperature gas stream sufficiently to overcome the pressure drop of the cryogenic gas circuit, and circulating the gas in such a manner as to precool the gas using the cooling available from the cold gas returning from the rotor. In this manner, the maximum thermodynamic efficiency is achieved, and the cooling requirement for the stationary refrigerator is minimized. This best mode differs from the practices known in the prior art as follows: 1) the gaseous stream may be circulated at a low pressure, without having to expand the gas from high pressures to achieve liquefaction; 2) joule-thompson expansion valves are eliminated from the circuit, thereby improving the reliability of the system; and 3) the low-pressure gaseous cryogen cooling circuit can be kept independent from the refrigerator gas circuit, thereby permitting redundancy and serviceability of the refrigerator components independent of the low-pressure circuit.

The foregoing description of a preferred embodiment of the invention has been presented for purposes of illustration. It is not intended to be exhaustive or to limit the invention to the precise form disclosed, and obviously many modifications and variations are possible in light of the above teaching. For example, more than one superconductive coil 20 may be used in the superconductive rotor 10, and the superconductive wire is not limited to niobium-tin. It is intended that the scope of the invention be defined by the claims appended hereto.

We claim:

1. A superconductive rotor comprising:
    a) a generally longitudinally-extending axis;
    b) a generally cylindrical-shaped solid core generally coaxially aligned with said axis and having a pair of generally diametrically-opposed and generally longitudinally-extending slots;
    c) a generally longitudinally-extending, racetrack-shaped superconductive coil surrounding said solid core and having generally straight portions disposed in said slots;
    d) a generally longitudinally-extending, racetrack-shaped thermal shield generally enclosing said superconductive coil and having generally straight portions disposed in said slots, said thermal shield generally spaced apart from said superconductive coil and from said solid core; and
    e) a pair of end shafts each attached to said solid core and generally spaced-apart from said thermal shield, one of said pair of end shafts having a cryogen transfer coupling.

2. The superconductive rotor of claim 1, wherein said cryogen transfer coupling is a gaseous-cryogen transfer coupling having a first inlet in fluid communication with a gaseous cryogen cooled by a cryocooler coldhead first stage and having a second inlet in fluid communication with a gaseous cryogen cooled by a cryocooler coldhead second stage.

3. The superconductive rotor of claim 2, also including a first cooling tube disposed between said superconductive coil and said thermal shield, generally spaced apart from said thermal shield, in thermal contact with said superconductive coil, and in fluid communication with said second inlet of said gaseous-cryogen transfer coupling.

4. The superconductive rotor of claim 3, also including a second cooling tube disposed between said thermal shield and said solid core, generally spaced apart from said solid core, in thermal contact with said thermal shield, and in fluid communication with said first inlet of said gaseous-cryogen transfer coupling.

5. The superconductive rotor of claim 4, also including a generally tubular-shaped vacuum envelope attached to said solid core and said end shafts, covering said slots, and generally spaced apart from said thermal shield.

6. The superconductive rotor of claim 1, also including a pair of generally longitudinally-extending first support rods attached to said solid core proximate one of said slots, and also including a plurality of longitudinally spaced-apart, rubber-band-shaped, first suspension straps disposed in said one slot, each of said first suspension straps having a center section placed over said thermal shield and having end portions looped around said first support rods.

7. The superconductive rotor of claim 6, also including a pair of generally longitudinally-extending second support rods disposed in said one slot and attached to said thermal shield, and also including a multiplicity of longitudinally spaced-apart, rubber-band-shaped, second suspension straps disposed in said one slot, each of said second suspension straps having a center section placed over said superconductive coil and having end portions looped around said second support rods.

8. The superconductive rotor of claim 7, also including spacer tubes disposed in said one slot, each of said spacer tubes, having a first end attached to said solid core and having a second end extending into said one slot towards said thermal shield, and also including spacer plates disposed in said one slot, each of said spacer plates having a first portion attached to said thermal shield and having a second portion extending towards said superconductive coil.

9. The superconductive rotor of claim 1, wherein said superconductive coil comprises a stainless-steel support wire co-paired and co-wound with a niobium-tin superconductive wire having a copper stabilizer.

10. The superconductive rotor of claim 1, wherein said superconductive coil is an electric-generator field coil, and wherein another one of said pair of end shafts has a turbine coupling.

* * * * *